US012652560B2

(12) United States Patent
Takeda et al.

(10) Patent No.: US 12,652,560 B2
(45) Date of Patent: Jun. 9, 2026

(54) SIGNALING DETAILS FOR TEMPORARY REFERENCE SIGNAL BASED SECONDARY CELL ACTIVATION

(71) Applicant: QUALCOMM Incorporated, San Diego, CA (US)

(72) Inventors: Kazuki Takeda, Minato-ku (JP); Peter Gaal, San Diego, CA (US); Punyaslok Purkayastha, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/979,739

(22) Filed: Nov. 2, 2022

(65) Prior Publication Data

US 2023/0137380 A1     May 4, 2023

Related U.S. Application Data

(60) Provisional application No. 63/275,821, filed on Nov. 4, 2021.

(51) Int. Cl.
*H04W 24/08* (2009.01)
*H04L 5/00* (2006.01)
*H04W 76/20* (2018.01)
*H04W 80/02* (2009.01)

(52) U.S. Cl.
CPC ........... *H04W 24/08* (2013.01); *H04L 5/0051* (2013.01); *H04W 76/20* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2019/0215117 A1 | 7/2019 | Lee et al. | |
| 2020/0028613 A1* | 1/2020 | Nam | H04L 27/26025 |
| 2021/0068129 A1 | 3/2021 | Ryu et al. | |
| 2023/0361961 A1* | 11/2023 | Li | H04W 72/232 |
| 2024/0179781 A1* | 5/2024 | Pu | H04B 7/0626 |
| 2024/0195566 A1* | 6/2024 | Ohara | H04W 76/15 |
| 2024/0214174 A1* | 6/2024 | He | H04W 52/0235 |

OTHER PUBLICATIONS

International Search Report and Written Opinion—PCT/US2022/079196—ISA/EPO—Feb. 23, 2023.
Taiwan Search Report—TW111142167—TIPO—Oct. 28, 2025.

* cited by examiner

*Primary Examiner* — Peter P Chau
(74) *Attorney, Agent, or Firm* — Patterson + Sheridan, L.L.P.

(57) ABSTRACT

Certain aspects of the present disclosure provide techniques for a method for wireless communications by a user equipment (UE), comprising receiving radio resource control (RRC) signaling configuring the UE with one or more per-carrier reference signal (RS) configurations, receiving dynamic signaling that activates a secondary cell and indicates at least one of the one or more per-carrier RS configurations, and monitoring for a temporary RS on the secondary cell based at least in part on the at least one of the one or more RS configurations indicated by the dynamic signaling.

28 Claims, 16 Drawing Sheets

800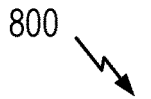

```
┌──────────────┐                              ┌──────────────┐
│      UE      │                              │   Network    │
│              │                              │    Entity    │
└──────────────┘                              └──────────────┘
       │                                             │
       │      RRC config. with per-carrier aperiodic │
806 ──│      trigger state lists for one or more types of │
       │<─────── reference signals (RS) ─────────────│
       │                                             │
       │      MAC CE with SCell Activation and       │
       │      indicating trigger state for temp RS   │── 808
       │<────────────────────────────────────────────│
```

┌──────────────────────┐
│ monitor for a temp RS on │ ── 810
│ the secondary cell based │
│   on at least one RS     │
│ configuration associated │
│   with the trigger state │
│ indicated by the MAC CE  │
└──────────────────────┘

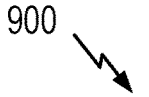

```
┌─────────────┐                                    ┌─────────────┐
│             │                                    │  Network    │
│     UE      │                                    │   Entity    │
└──────┬──────┘                                    └──────┬──────┘
       │                                                  │
       │        RRC config. with per-carrier aperiodic    │
 906   │       trigger state lists for one or more types  │
       │            of reference signals (RS)             │
       │ ◄────────────────────────────────────────────── │
       │                                                  │
       │                                                  │
       │                                                  │── 908
       │          MAC CE with SCell Activation            │
       │ ◄────────────────────────────────────────────── │
       │                                                  │
       │                                                  │── 910
       │          DCI indicating trigger state            │
       │ ◄────────────────────────────────────────────── │
       │                                                  │
┌──────┴────────────┐                                     │
│ monitor for a temp│── 912                               │
│ RS on the         │                                     │
│ secondary cell    │                                     │
│ based on at least │                                     │
│ one RS            │                                     │
│ configuration     │                                     │
│ associated with   │                                     │
│ the trigger state │                                     │
│ indicated in the  │                                     │
│ DCI               │                                     │
└──────┬────────────┘                                     │
       │                                                  │
```

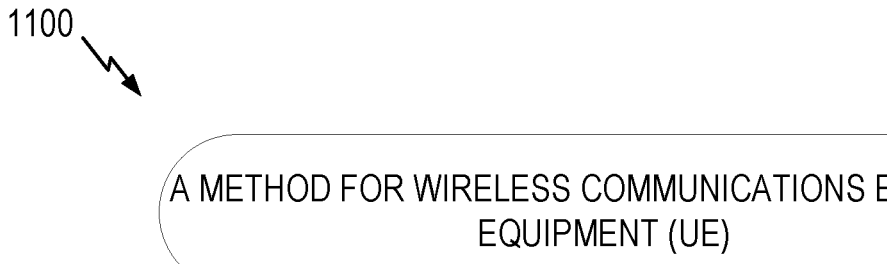

A METHOD FOR WIRELESS COMMUNICATIONS BY A USER EQUIPMENT (UE)

1110

RECEIVE RADIO RESOURCE CONTROL (RRC) SIGNALING CONFIGURING THE UE FOR CHANNEL STATE INFORMATION (CSI) REPORTING WITH PER-CARRIER APERIODIC TRIGGER STATE LISTS FOR ONE OR MORE TYPES OF REFERENCE SIGNALS (RS)

1120

RECEIVE DYNAMIC SIGNALING THAT ACTIVATES A SECONDARY CELL AND INDICATES AT LEAST ONE TRIGGER STATE FROM A PER-CARRIER APERIODIC TRIGGER STATE LIST OF THE PER-CARRIER APERIODIC TRIGGER STATE LISTS ASSOCIATED WITH THE SECONDARY CELL

1130

MONITOR FOR A TEMPORARY RS ON THE SECONDARY CELL BASED AT LEAST IN PART ON AT LEAST ONE RS CONFIGURATION ASSOCIATED WITH THE AT LEAST ONE TRIGGER STATE

*FIG. 11*

1200

A METHOD FOR WIRELESS COMMUNICATIONS BY A NETWORK ENTITY

1210

TRANSMIT, TO A USER EQUIPMENT (UE), RADIO RESOURCE CONTROL (RRC) SIGNALING CONFIGURING THE UE FOR CHANNEL STATE INFORMATION (CSI) REPORTING WITH PER-CARRIER APERIODIC TRIGGER STATE LISTS FOR ONE OR MORE TYPES OF REFERENCE SIGNALS (RS)

1220

TRANSMIT DYNAMIC SIGNALING THAT ACTIVATES A SECONDARY CELL AND INDICATES AT LEAST ONE TRIGGER STATE FROM ONE OF THE PER-CARRIER APERIODIC TRIGGER STATE LISTS ASSOCIATED WITH THE SECONDARY CELL TO TRIGGER THE UE TO MONITOR FOR A TEMPORARY RS TRANSMITTED ON THE SECONDARY CELL BASED AT LEAST IN PART ON AT LEAST ONE RS CONFIGURATION ASSOCIATED WITH THE AT LEAST ONE TRIGGER STATE

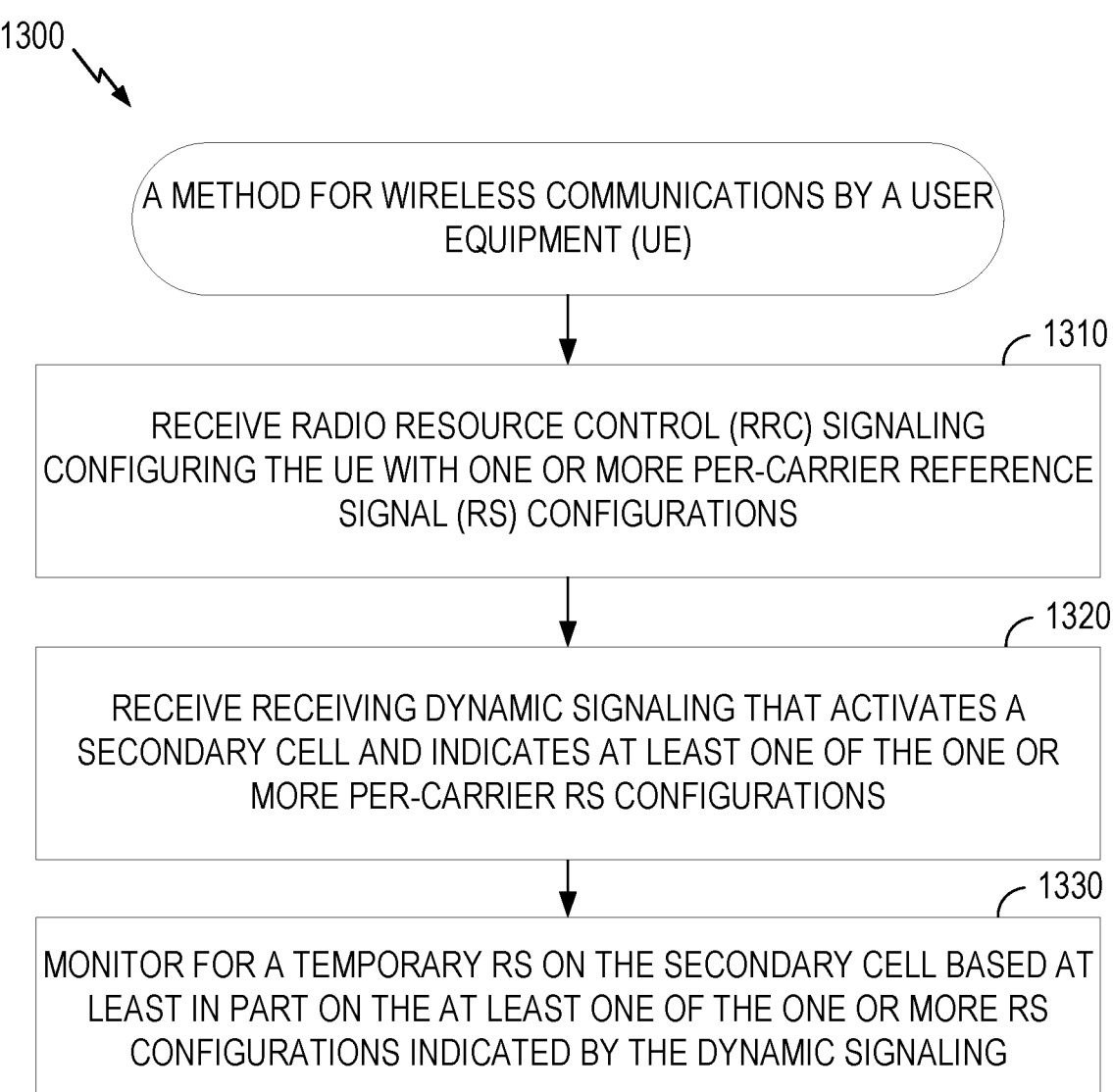

A METHOD FOR WIRELESS COMMUNICATIONS BY A USER EQUIPMENT (UE)

1310

RECEIVE RADIO RESOURCE CONTROL (RRC) SIGNALING CONFIGURING THE UE WITH ONE OR MORE PER-CARRIER REFERENCE SIGNAL (RS) CONFIGURATIONS

1320

RECEIVE RECEIVING DYNAMIC SIGNALING THAT ACTIVATES A SECONDARY CELL AND INDICATES AT LEAST ONE OF THE ONE OR MORE PER-CARRIER RS CONFIGURATIONS

1330

MONITOR FOR A TEMPORARY RS ON THE SECONDARY CELL BASED AT LEAST IN PART ON THE AT LEAST ONE OF THE ONE OR MORE RS CONFIGURATIONS INDICATED BY THE DYNAMIC SIGNALING

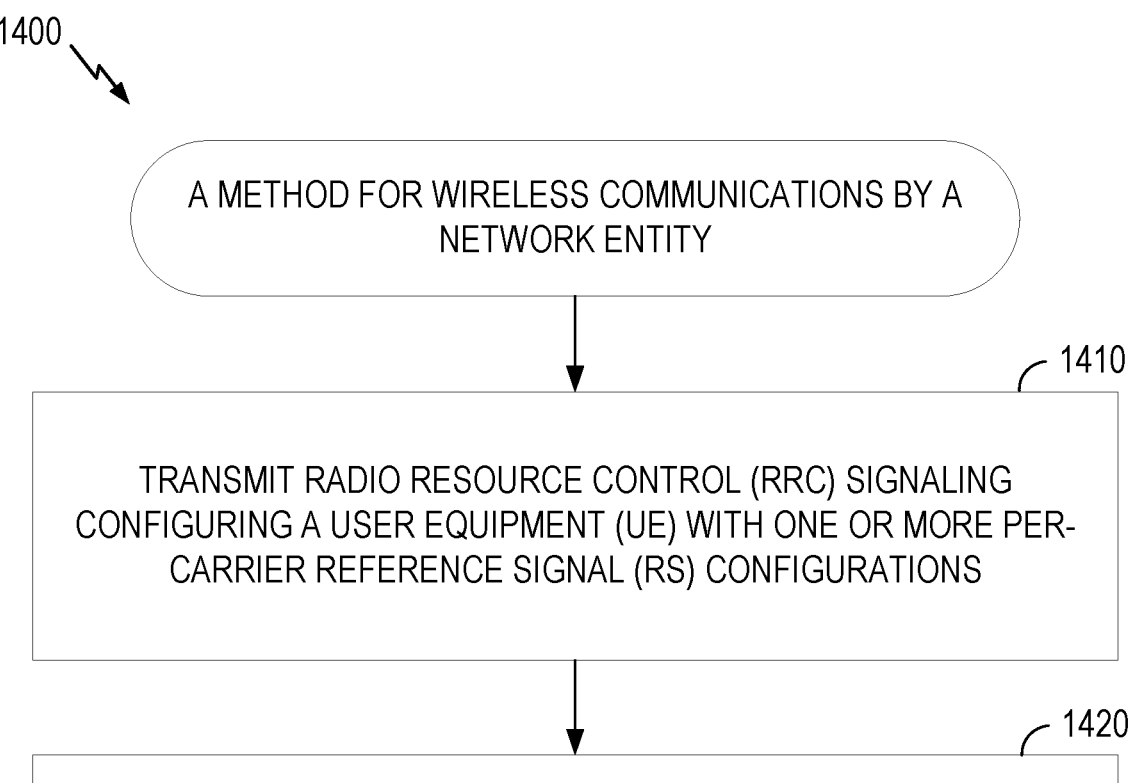

A METHOD FOR WIRELESS COMMUNICATIONS BY A NETWORK ENTITY

1410

TRANSMIT RADIO RESOURCE CONTROL (RRC) SIGNALING CONFIGURING A USER EQUIPMENT (UE) WITH ONE OR MORE PER-CARRIER REFERENCE SIGNAL (RS) CONFIGURATIONS

1420

TRANSMIT DYNAMIC SIGNALING THAT ACTIVATES A SECONDARY CELL AND INDICATES AT LEAST ONE OF THE ONE OR MORE PER-CARRIER RS CONFIGURATIONS FOR TEMPORARY RS TRANSMISSIONS ON THE SECONDARY CELL

Figure 15:
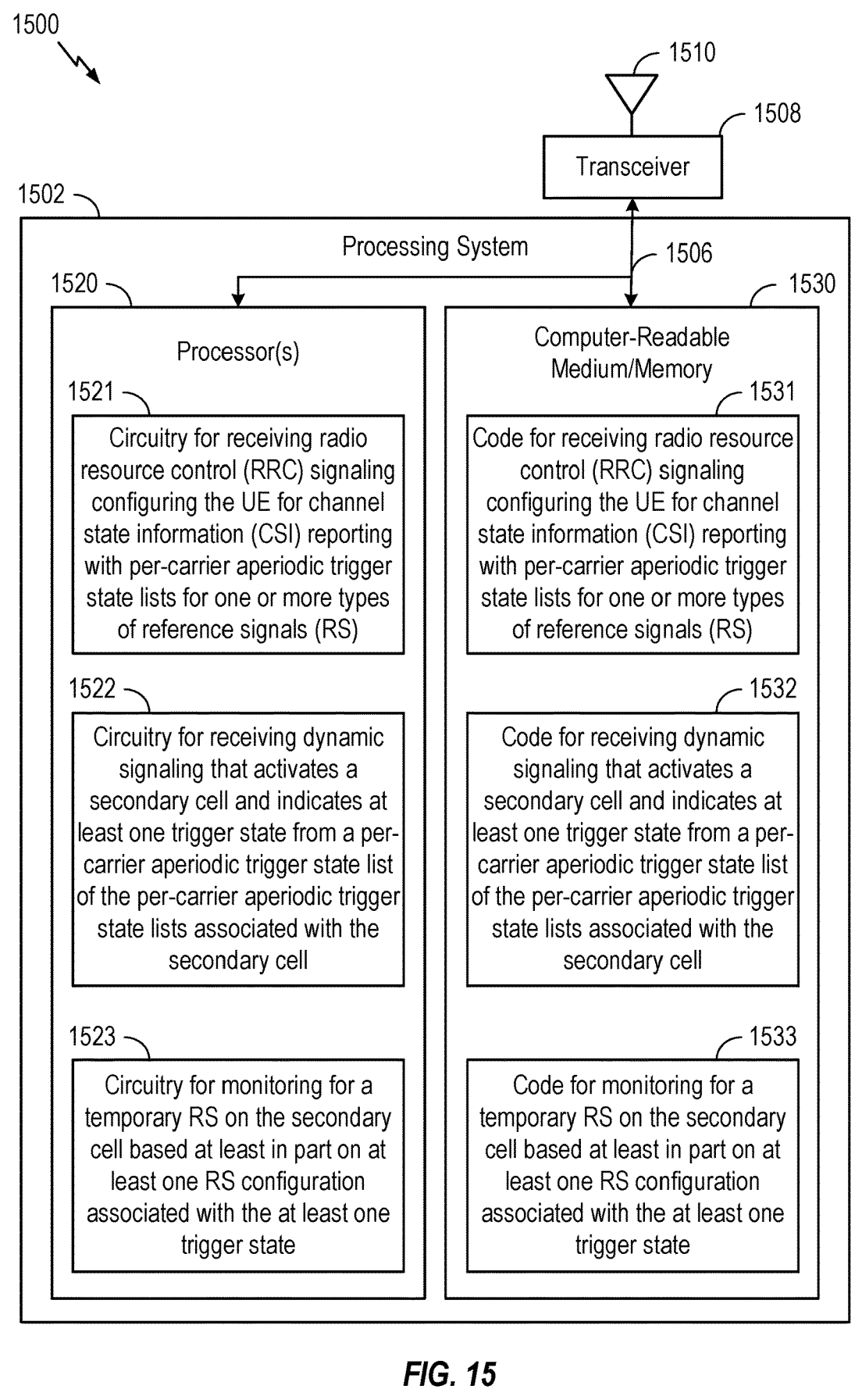

Transceiver

1502

Processing System

1506

1520

1530

Processor(s)

Computer-Readable
Medium/Memory

1521

1531

Circuitry for receiving radio
resource control (RRC) signaling
configuring the UE for channel
state information (CSI) reporting
with per-carrier aperiodic trigger
state lists for one or more types
of reference signals (RS)

Code for receiving radio resource
control (RRC) signaling
configuring the UE for channel
state information (CSI) reporting
with per-carrier aperiodic trigger
state lists for one or more types
of reference signals (RS)

1522

1532

Circuitry for receiving dynamic
signaling that activates a
secondary cell and indicates at
least one trigger state from a per-
carrier aperiodic trigger state list
of the per-carrier aperiodic trigger
state lists associated with the
secondary cell Code for receiving dynamic
signaling that activates a
secondary cell and indicates at
least one trigger state from a per-
carrier aperiodic trigger state list
of the per-carrier aperiodic trigger
state lists associated with the
secondary cell

1523

1533

Circuitry for monitoring for a
temporary RS on the secondary
cell based at least in part on at
least one RS configuration
associated with the at least one
trigger state Code for monitoring for a
temporary RS on the secondary
cell based at least in part on at
least one RS configuration
associated with the at least one
trigger state

Transceiver

1602

Processing System          1606

1620                                                                              1630

Processor(s)                              Computer-Readable
                                            Medium/Memory 1621                                                                              1631

Circuitry for transmitting, to a
user equipment (UE), radio
resource control (RRC) signaling
configuring the UE for channel
state information (CSI) reporting
with per-carrier aperiodic trigger
state lists for one or more types
of reference signals (RS)

Code for transmitting, to a user
equipment (UE), radio resource
control (RRC) signaling
configuring the UE for channel
state information (CSI) reporting
with per-carrier aperiodic trigger
state lists for one or more types
of reference signals (RS)

1622                                                                              1632

Circuitry for transmitting dynamic
signaling that activates a
secondary cell and indicates at
least one trigger state from one
of the per-carrier aperiodic trigger
state lists associated with the
secondary cell to trigger the UE
to monitor for a temporary RS
transmitted on the secondary cell
based at least in part on at least
one RS configuration associated
with the at least one trigger state Code for transmitting dynamic
signaling that activates a
secondary cell and indicates at
least one trigger state from one
of the per-carrier aperiodic trigger
state lists associated with the
secondary cell to trigger the UE
to monitor for a temporary RS
transmitted on the secondary cell
based at least in part on at least
one RS configuration associated
with the at least one trigger state

*FIG. 16*

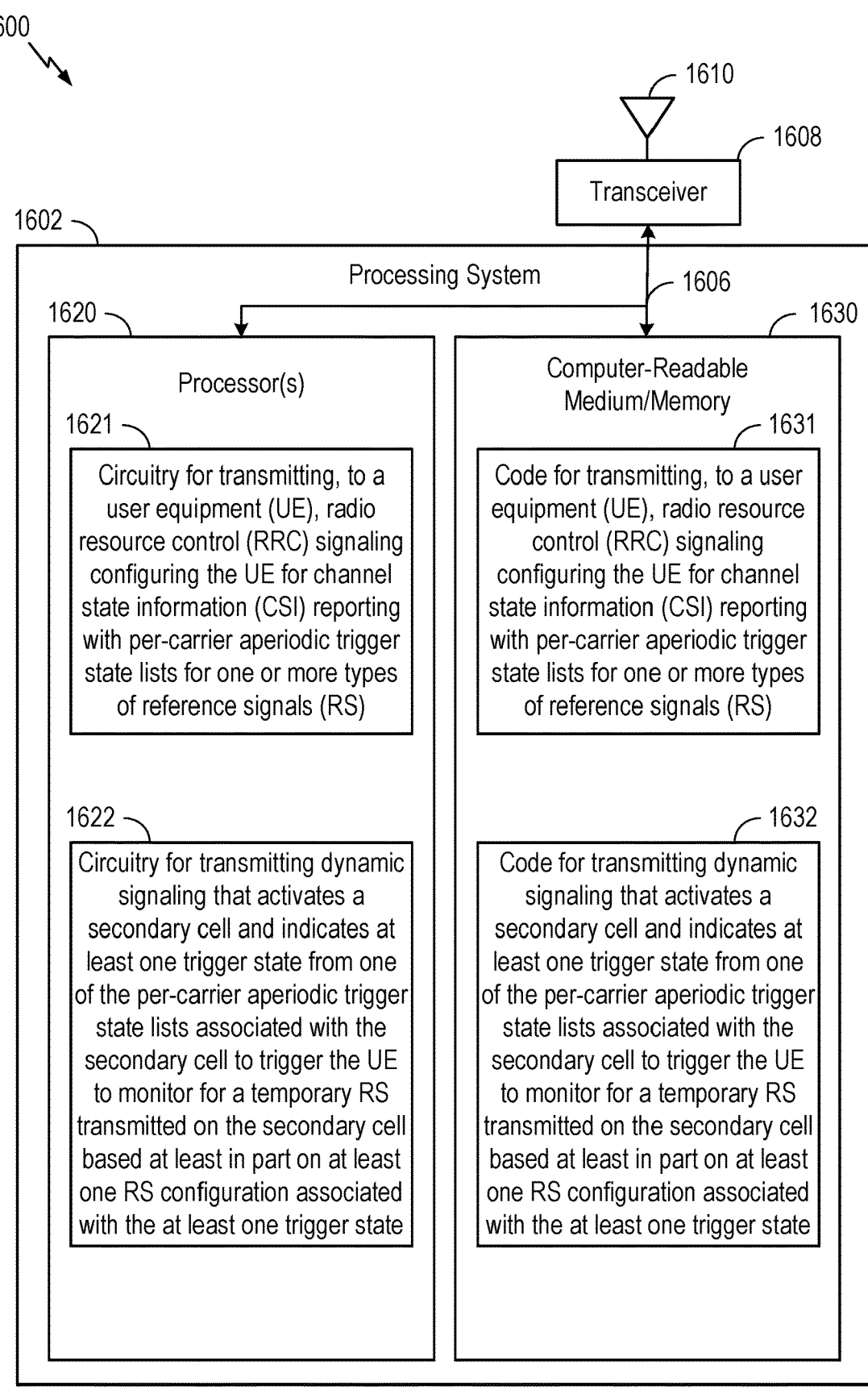

SIGNALING DETAILS FOR TEMPORARY REFERENCE SIGNAL BASED SECONDARY CELL ACTIVATION

CROSS-REFERENCE TO RELATED APPLICATIONS

This application claims benefit of and priority to U.S. Application No. 63/275,821, filed Nov. 4, 2021, which is assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for monitoring for a temporary reference signal (Temp RS) on a secondary cell (SCell) based on an RS configuration.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method generally includes receiving radio resource control (RRC) signaling configuring the UE with one or more per-carrier reference signal (RS) configurations, receiving dynamic signaling that activates a secondary cell and indicates at least one of the one or more per-carrier RS configurations, and monitoring for a temporary RS on the secondary cell based at least in part on the at least one of the one or more RS configurations indicated by the dynamic signaling.

One aspect provides method for wireless communications by a network entity. The method generally includes transmitting radio resource control (RRC) signaling configuring a user equipment (UE) with one or more per-carrier reference signal (RS) configurations and transmitting dynamic signaling that activates a secondary cell and indicates at least one of the one or more per-carrier RS configurations.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7 depicts a timeline for a temporary RS.

FIG. 8 is a call flow diagram depicting a first example of temporary RS based SCell activation, in accordance with some aspects of the present disclosure.

FIG. 9 is a call flow diagram depicting a second example of temporary RS based SCell activation, in accordance with some aspects of the present disclosure.

FIG. 11 illustrates example operations for wireless communications by a UE, in accordance with some aspects of the present disclosure.

FIG. 12 illustrates example operations for wireless communications by a network entity, in accordance with some aspects of the present disclosure.

FIG. 13 illustrates example operations for wireless communications by a UE, in accordance with some aspects of the present disclosure.

FIG. 14 illustrates example operations for wireless communications by a network entity, in accordance with some aspects of the present disclosure.

FIG. 15 depicts aspects of an example communications device.

FIG. 16 depicts aspects of an example communications device.

DETAILED DESCRIPTION

Figure 1:
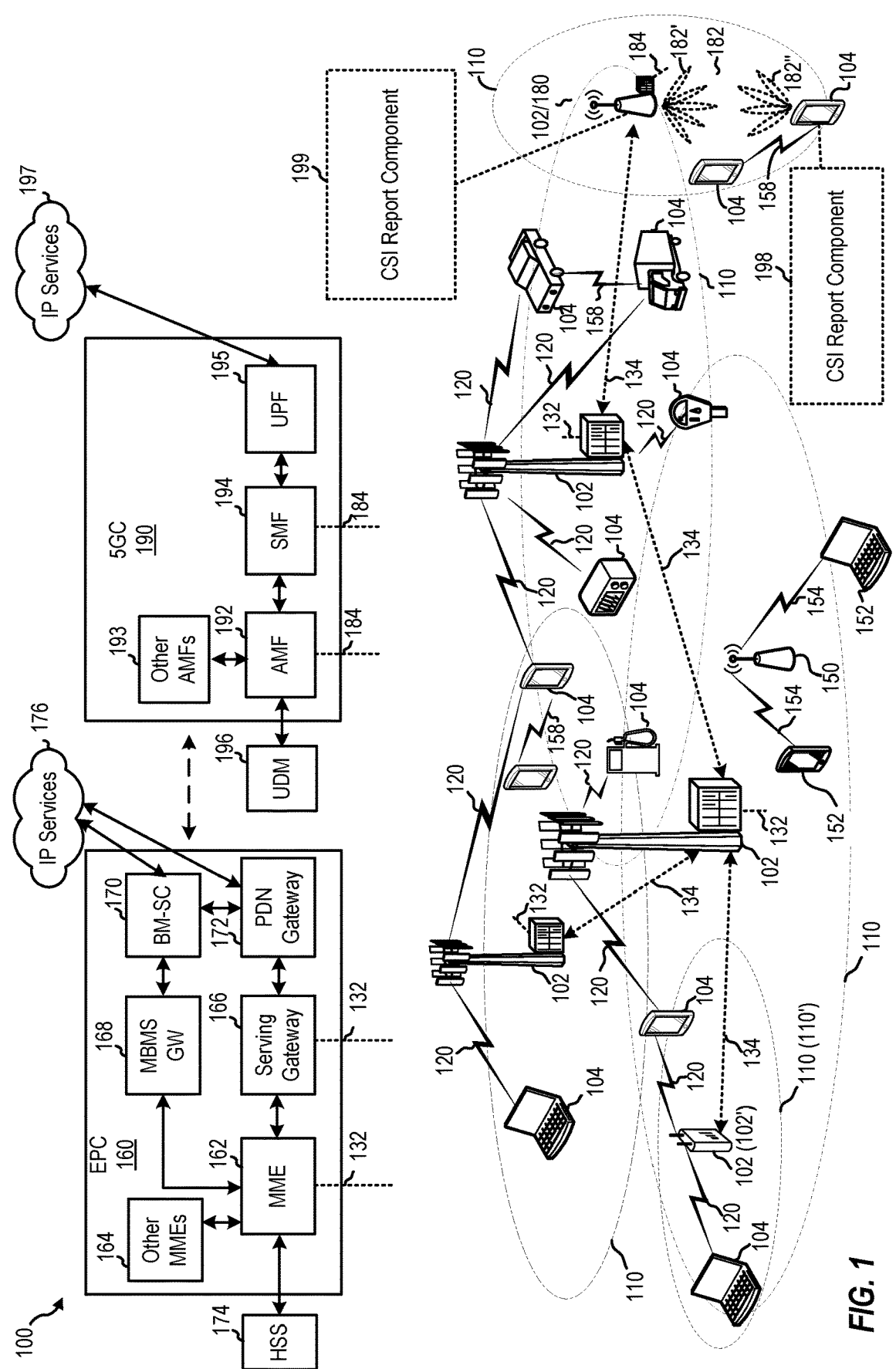
FIG. 1 is a block diagram conceptually illustrating an example wireless communication network.

Aspects of the present disclosure provide apparatuses, methods, processing systems, and computer-readable mediums for a UE to determine temporary reference signal (RS) to monitor on a secondary cell (SCell) based on an RS configuration.

Certain wireless communications systems, support different cell types, such as primary cell (PCell) and secondary cell (SCell) types. A primary cell generally refers to a cell in which a user equipment (UE) performs an initial connection establishment procedure and initiates a connection re-establishment procedure, or a cell indicated as the primary cell in a handover procedure. An SCell generally refers to a cell, operating on a different frequency than the primary cell, which may be configured once a radio resource control (RRC) connection is established and may be used to provide additional radio resources.

After a UE receives a command that activates an SCell, there may be a delay to allow the UE to monitor for reference signals referred to as synchronization signal blocks (SSBs) that the UE will use to adjust its time and frequency tracking before sending a channel state information (CSI) report. Because there may be a relatively long period between SSBs, this delay may be substantial. In some cases, to reduce this delay, an aperiodic temporary reference signal (temp RS) may be transmitted after SCell activation, at an earlier time than the next SSB. The earlier timing of this temp RS may allow the UE to make measurements in the SCell and send a CSI report sooner than if it had to wait on a subsequent SSB.

In this manner, use of a temp RS may reduce SCell activation delay and enables efficient use of SCell for data traffic. One challenge with temp RS based SCell activation is how to configure the UE with details for the temp RS and how to indicate triggering of the temp RS to the UE. In other words, the challenge is how to indicate which temp RS the UE is to monitor in the SCell, after receiving an indication the SCell is to be activated.

A first option to address this challenge is to define a new set of RRC parameters to configure the temp RS and to use a corresponding new medium access control (MAC) control element (CE) to trigger the temp RS. Unfortunately, this option may entails extra specification efforts to define signaling of parameters which may be similar to existing parameters, resulting in duplicated efforts and increased signaling overhead due to all RRC parameters related to triggering a temp RS having to be duplicated for each carrier.

A second option is to re-use existing RRC parameters for aperiodic CSI-RS and/or tracking reference signal (TRS). Unfortunately, trigger states (for activating aperiodic CSI-RS/TRS are typically configured for all carriers (rather than just the SCell carrier), which is less flexible and leads to suboptimal communication performance.

Aspects of the present disclosure provide a flexible approach to signal, to a UE, a temp RS configuration and signal temp RS activation. As will be described in greater detail below, according to certain aspects, an RRC signaling mechanism that includes per-carrier aperiodic trigger state lists, each associated with one or more RS configurations may avoid the need for duplicating other RRC parameters and allow some RRC parameters to be reused. According to certain aspects, dynamic signaling, such as a MAC-CE, may activate an SCell and may also indicate an RS configuration to monitor in the SCell. Signaling mechanisms proposed herein may result in reduced RRC overhead compared to the overhead associated with duplicating all RRC parameters related to triggering a temp RS.

According to certain aspects, signaling mechanisms proposed herein may allow a MAC-CE or other signaling to separately indicate trigger states for different carriers separately. A MAC CE, or other signaling with separate trigger state indication fields for different carriers, may allow for flexible temp RS indication unlike an approach that reuses all RRC parameters for all the carriers.

Introduction to Wireless Communication Networks

FIG. 1 depicts an example of a wireless communications system 100, in which aspects described herein may be implemented.

Generally, wireless communications system 100 includes network entities 102, user equipments (UEs) 104, one or more core networks, such as an Evolved Packet Core (EPC) 160 and 5G Core (5GC) network 190, which interoperate to provide wireless communications services.

Network entities 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Network entities may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Network entities 102 wirelessly communicate with UEs 104 via communications links 120. Each of network entities 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between network entities 102 and UEs 104 may include uplink (UL) (also referred to as reverse link) transmissions from a user equipment 104 to a network entity 102 and/or downlink (DL) (also referred to as forward link) transmissions from a network entity 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain network entities (e.g., 180 in FIG. 1) may utilize beamforming 182 with a UE 104 to improve path loss and range. For example, network entity 180 and the UE 104 may each include a plurality of antennas, such as antenna elements, antenna panels, and/or antenna arrays to facilitate the beamforming.

In some cases, network entity 180 may transmit a beamformed signal to UE 104 in one or more transmit directions 182'. UE 104 may receive the beamformed signal from the network entity 180 in one or more receive directions 182". UE 104 may also transmit a beamformed signal to the network entity 180 in one or more transmit directions 182". Network entity 180 may also receive the beamformed signal from UE 104 in one or more receive directions 182'. Network entity 180 and UE 104 may then perform beam training to determine the best receive and transmit directions for each of network entity 180 and UE 104. Notably, the transmit and receive directions for network entity 180 may or may not be the same. Similarly, the transmit and receive directions for UE 104 may or may not be the same.

Wireless communication network 100 includes channel state information (CSI) report component 199, which may be configured to transmit CSI report and/or RS configurations. Wireless network 100 further includes CSI report component 198, which may be used configured to receive CSI report configurations.

Figure 2:
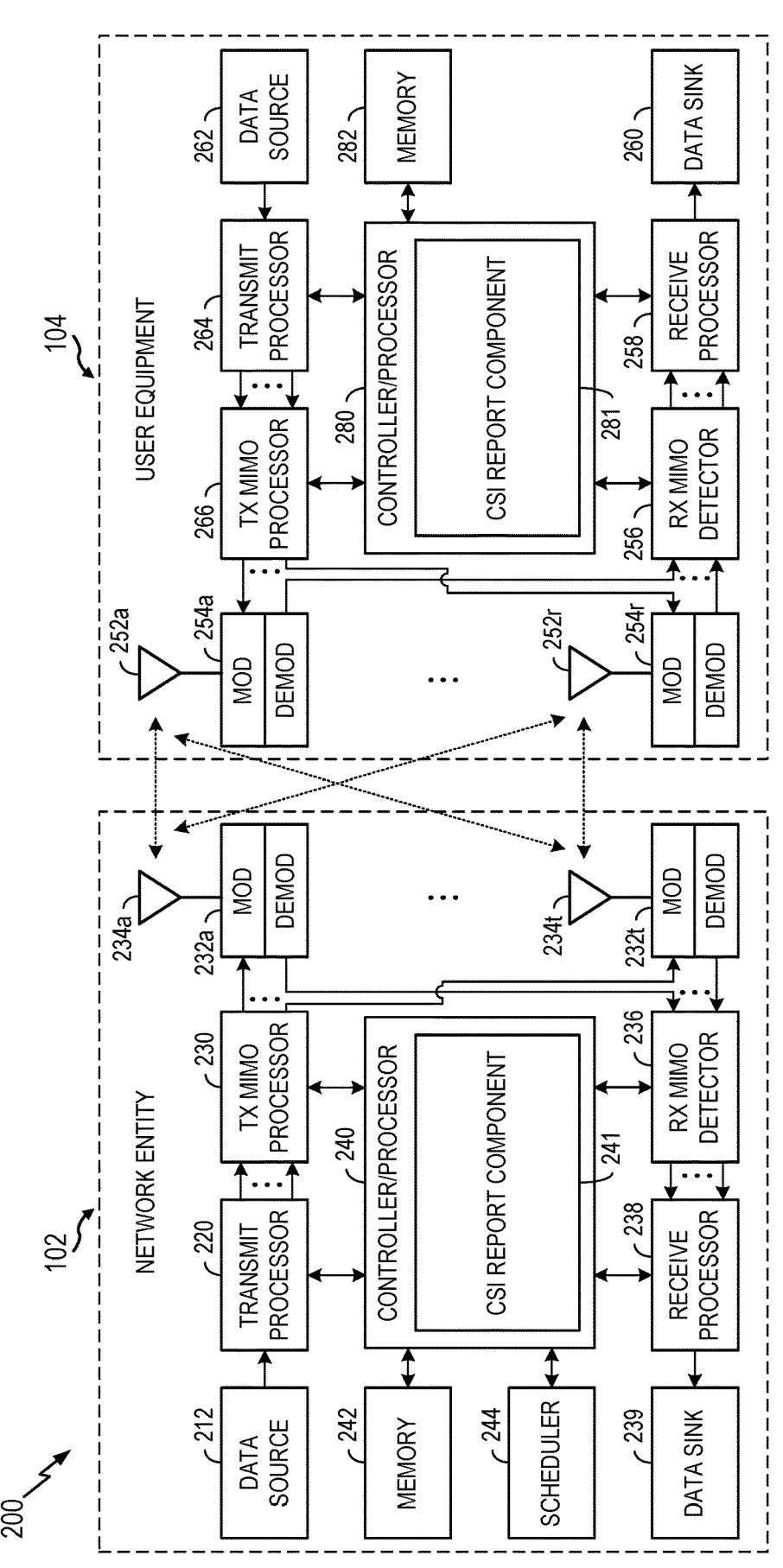
FIG. 2 is a block diagram conceptually illustrating aspects of an example of a network entity and user equipment.

FIG. 2 depicts aspects of an example network entity 102 and a user equipment (UE) 104.

Generally, network entity 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, network entity 102 may send and receive data between itself and user equipment 104.

Network entity 102 includes controller/processor 240, which may be configured to implement various functions related to wireless communications. In the depicted example, controller/processor 240 includes CSI report component 241, which may be representative of CSI report component 199 of FIG. 1. Notably, while depicted as an aspect of controller/processor 240, CSI report component 241 may be implemented additionally or alternatively in various other aspects of network entity 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

In various aspects, a network device, a network entity, or network node can be implemented as an aggregated network entity, as a disaggregated network entity, a component of a network entity, an integrated access and backhaul (IAB) node, a relay node, a sidelink node, to name a few examples.

The disaggregated network entity architecture may include one or more central units (CUs) that can communicate directly with a core network via a backhaul link, or indirectly with the core network through one or more disaggregated network entity units (such as a Near-Real Time (Near-RT) RAN Intelligent Controller (RIC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 104 via one or more radio frequency (RF) access links. In some implementations, the UE 104 may be simultaneously served by multiple RUs.

Each of the units, e.g., the CUs, the DUs, the RUs, as well as the Near-RT RICs, the Non-RT RICs and the SMO Framework, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (e.g., Central Unit-User Plane (CU-UP)), control plane functionality (e.g., Central Unit-Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The DU may correspond to a logical unit that includes one or more network entity functions to control the operation of one or more RUs. In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU may further host one or more low PHY layers. Each layer (or module) can be implemented with an interface configured to communicate signals with other layers (and modules) hosted by the DU, or with the control functions hosted by the CU.

Lower-layer functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communications with one or more UEs 104. In some implementations, real-time and non-real-time aspects of control and user plane communications with the RU(s) can be controlled by the corresponding DU. In some scenarios, this configuration can enable the DU(s) and the CU to be implemented in a cloud-based RAN architecture, such as a vRAN architecture.

The SMO Framework may be configured to support RAN deployment and provisioning of non-virtualized and virtualized network elements. For non-virtualized network elements, the SMO Framework may be configured to support the deployment of dedicated physical resources for RAN coverage requirements which may be managed via an operations and maintenance interface (such as an O1 interface). For virtualized network elements, the SMO Framework may be configured to interact with a cloud computing platform (such as an open cloud (O-Cloud)) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework can communicate with a hardware aspect of a 4G RAN, such as an open eNB (O-eNB), via an O1 interface. Additionally, in some implementations, the SMO Framework can communicate directly with one or more RUs via an O1 interface. The SMO Framework also may include a Non-RT RIC configured to support functionality of the SMO Framework.

The Non-RT RIC may be configured to include a logical function that enables non-real-time control and optimization of RAN elements and resources, Artificial Intelligence/ Machine Learning (AI/ML) workflows including model training and updates, or policy-based guidance of applications/features in the Near-RT RIC. The Non-RT RIC may be coupled to or communicate with (such as via an AI interface) the Near-RT RIC. The Near-RT RIC may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC.

In some implementations, to generate AI/ML models to be deployed in the Near-RT RIC, the Non-RT RIC may receive parameters or external enrichment information from external servers. Such information may be utilized by the Near-RT RIC and may be received at the SMO Framework or the Non-RT RIC from non-network data sources or from network functions. In some examples, the Non-RT RIC or the Near-RT RIC may be configured to tune RAN behavior or performance. For example, the Non-RT RIC may monitor long-term trends and patterns for performance and employ AI/ML models to perform corrective actions through the SMO Framework (such as reconfiguration via O1) or via creation of RAN management policies (such as AI policies).

User equipment 104 includes controller/processor 280, which may be configured to implement various functions related to wireless communications. In the depicted example, controller/processor 280 includes CSI report component 281, which may be representative of CSI report component 198 of FIG. 1. Notably, while depicted as an aspect of controller/processor 280, CSI report component 281 may be implemented additionally or alternatively in various other aspects of user equipment 104 in other implementations.

Figures 3A, 3B, 3C, 3D:
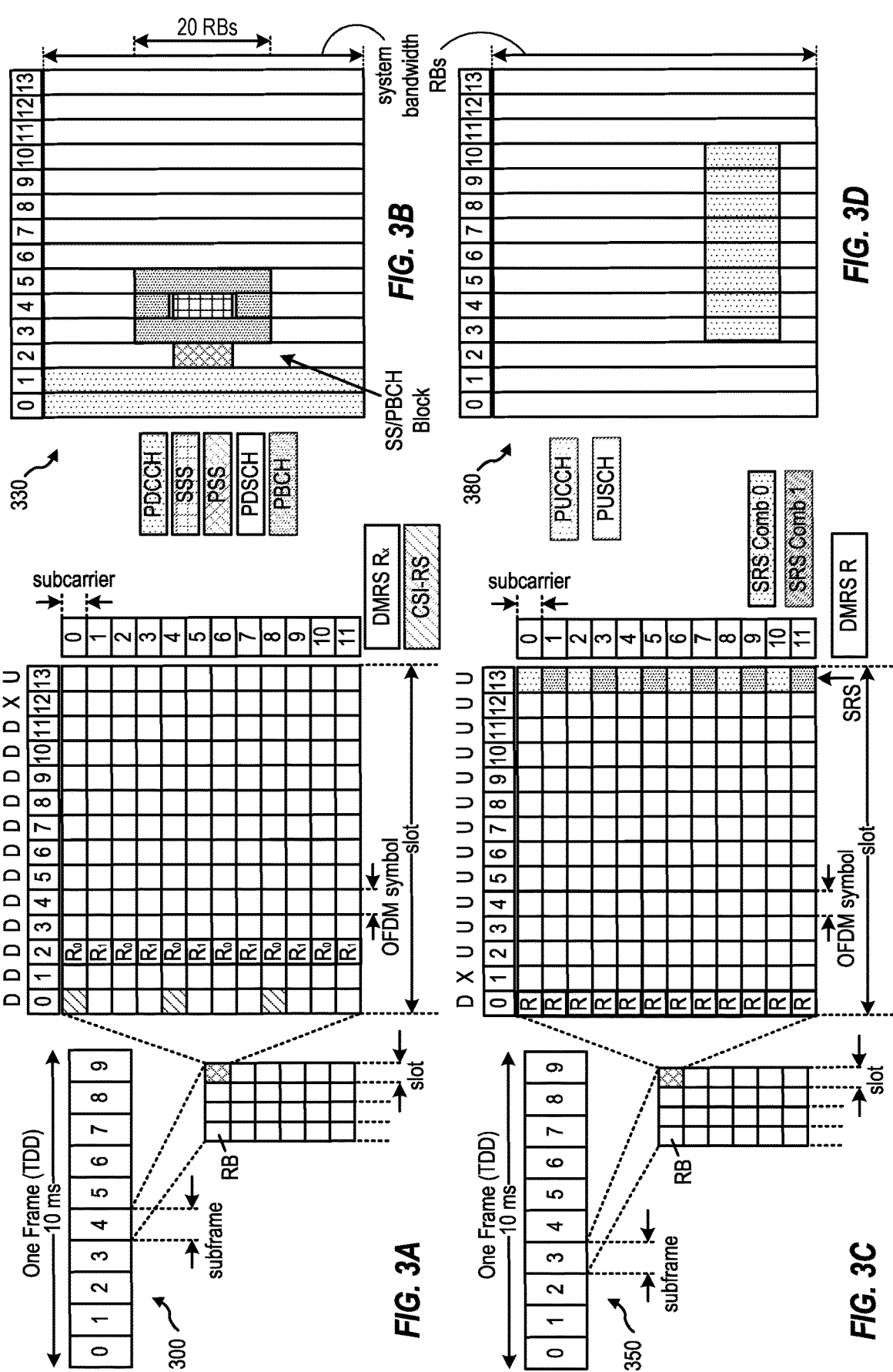
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example CSI Report Configuration

Channel state information (CSI) may refer to channel properties of a communication link. The CSI may represent the combined effects of, for example, scattering, fading, and power decay with distance between a transmitter and a receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically measured at the receiver, quantized, and fed back to the transmitter.

The time and frequency resources that can be used by a user equipment (UE) to report CSI are controlled by a network entity (e.g., gNB). CSI may include channel quality indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

A UE may be configured by a network entity for CSI reporting. The network entity may configure UEs for the CSI reporting. For example, the network entity configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both.

Figure 4:
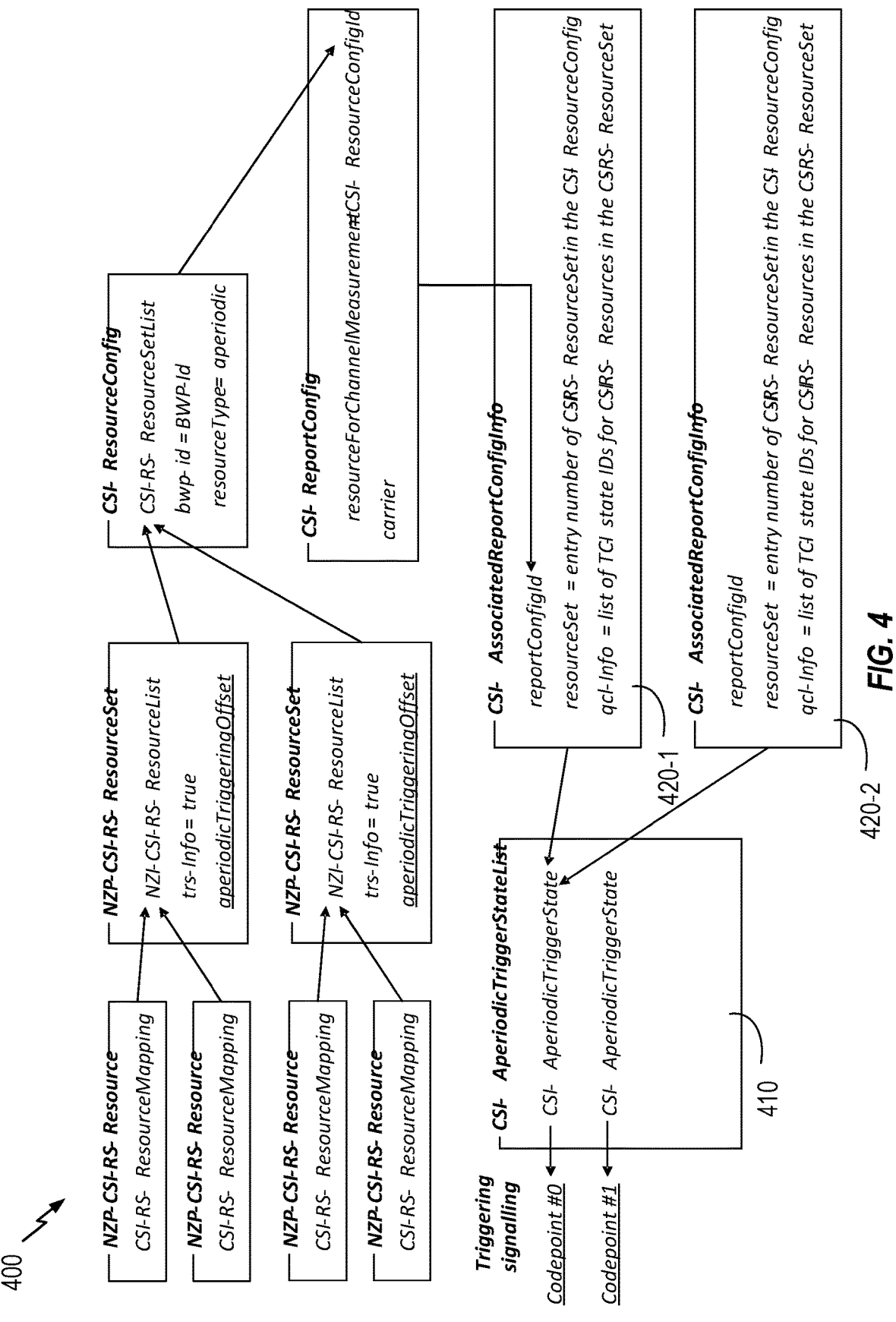
FIG. 4 is a diagram depicting an example channel state information (CSI) resources configuration.

For example, FIG. 4 illustrates a CSI report configuration with a CSI-RS resource mapping for CSI aperiodic trigger states. Various information elements (IEs) and corresponding fields shown in FIG. 4 are defined in standard (e.g., in 3GPP 38.331). The CSI report configuration configures CSI-RS resources for measurement (e.g., CSI-ResourceConfig of FIG. 4). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources (each defined by an element NZP-CSI-Resource associated with a NZP-CSI-RS-ResourceSet). In FIG. 4, NZP resources may be allotted in a CSI-RS-ResourceSetList for aperiodic trigger state signaling. At least one NZP CSI-RS resource may be configured for CM.

As illustrated, a CSI-ApereodicTriggerStateList information element (IE) 410 may include a list of CSI-Aperiodic-Trigger States. To trigger one of the trigger states in the list, a DCI or MAC-CE may indicate a codepoint. As illustrated, each trigger state may be associated with one or more CSI-RS configurations (CSI-AssociatedReportConfigInfo IEs). In the illustrated example, the first trigger state in the list is associated with two CSI-AssociatedReportConfigInfo IEs (420-1 and 420-2). By associating multiple RS configurations to a single trigger state, multiple aperiodic RS may be triggered at the same time.

The CSI-AssociatedReportConfigInfo IEs may include various fields, such as reportConfigId, resourceSet, and qcl-Info. The reportConfigId mapping to a particular CSI-ReportConfig IE. The resource set field may refer to an entry number of the CSI-RS-ResourceSet in the CSI-ResourceConfig IE. The qcl-info field may refer to a list of transmission configuration information (TCI) states for CSI-RS-Resources in the CSI-RS-ResourceSet IE.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE).

The UE may report the CSI feedback (CSF) based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSF for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink (DL) bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as NPRNSE contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Example Signaling Details for Temporary RS Based Secondary Cell Activation

Aspects of the present disclosure provide apparatuses, methods, processing systems, and computer-readable mediums for a UE to determine temporary reference signal (RS) to monitor on a secondary cell (SCell) based on an RS configuration. According to certain aspects, an RS configuration may be associated with a trigger state.

Figure 5:
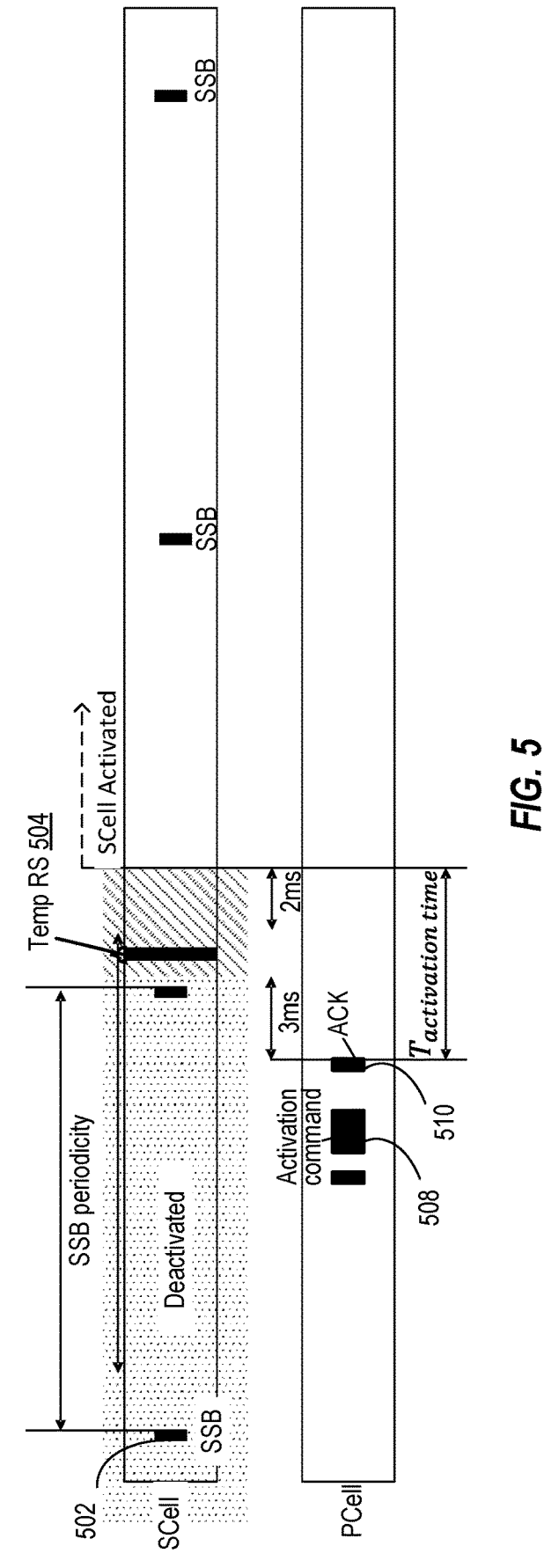
FIG. 5 depicts an example timeline for secondary cell (SCell) activation based on a temporary reference signal (RS).

For example, the techniques described herein may providing signaling details to configure and trigger a Temp RS 504 indicated in the example timeline 500 of FIG. 5.

As shown in FIG. 5, after a UE receives an activation command 508 (sent in the PCell) to activate an SCell, the SCell may not be considered active until 3 ms after the UE sends an acknowledgment (ACK) 510. In addition, there is additional delay to allow the UE to monitor for reference signals, such as SSBs 502, that the UE may use to adjust its time and frequency tracking before sending a channel state information (CSI) report. The sum of this delay is labeled in FIG. 5 and referred to as $T_{activation\ time}$.

As noted above, if the UE were to rely on SSBs for initial CSI measurements in the SCell, there may be substantial delay due to a relatively long period between SSBs. The use of a Temp RS may substantially reduce SCell activation time by allowing the UE to send a valid CSI report much sooner than if it were to wait on a subsequent SSB.

According to certain aspects of the present disclosure, a UE may be RRC configured for temporary RS utilizing similar RRC signaling for aperiodic CSI-RS and temporary RS, with trigger states defined using a "per-carrier" structure (e.g., described in greater detail below with reference to FIG. 10). Temp RS may be triggered (and details of the temp RS indicated to the UE) by indicating one of the trigger states.

Figures 6A, 6B:
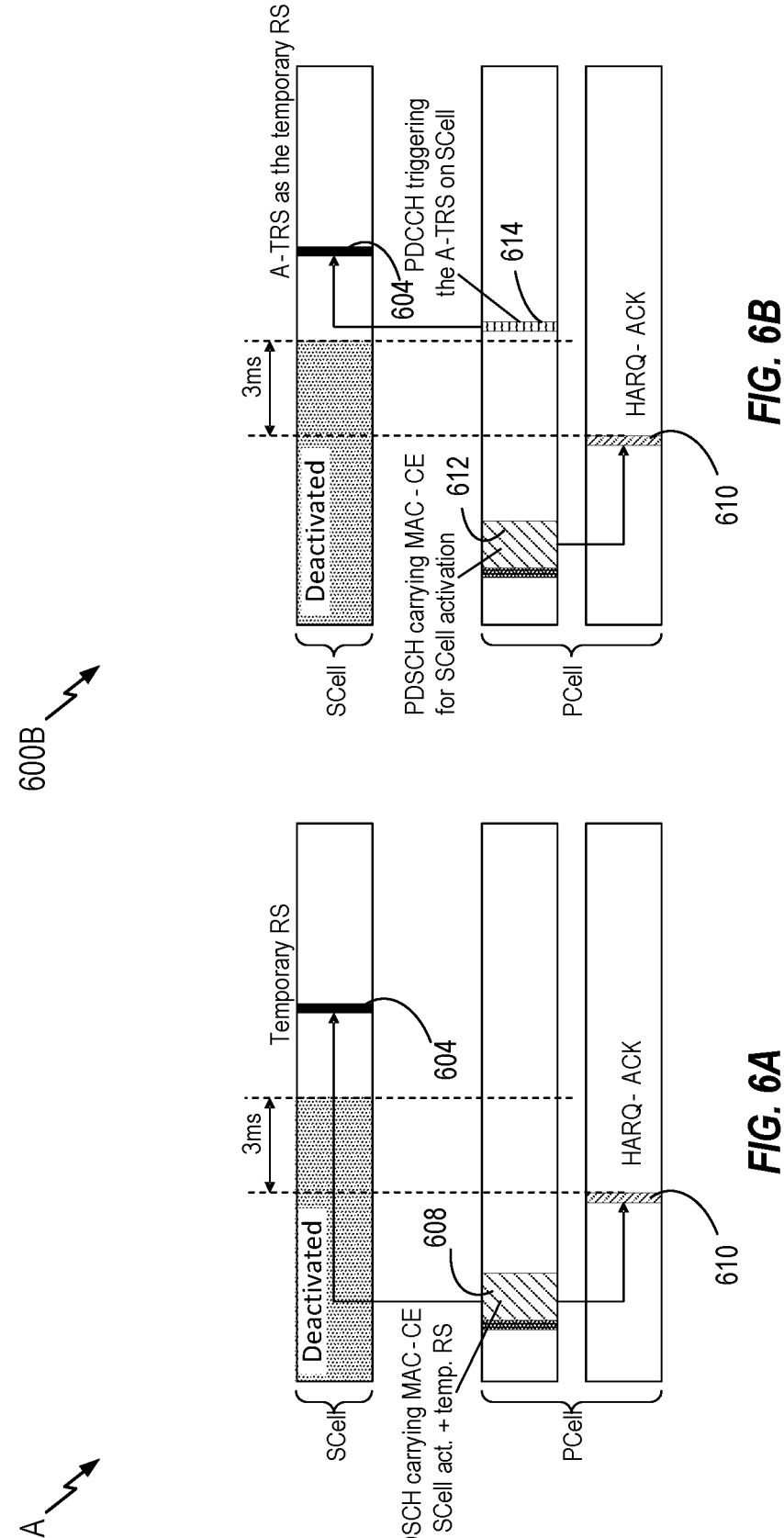
FIG. 6A and FIG. 6B depict example timelines for different options for triggering a temporary RS for SCell activation.

There are various options for triggering a temporary RS after SCell activation. For example, as illustrated in FIG. 6A, a physical downlink shared channel (PDSCH) may carry a MAC CE that activates the Scell and also triggers the Temp RS. In the illustrated example, the UE receives and acknowledges (via a hybrid automatic repeat request acknowledgment HARQ-ACK) the MAC CE in the PCell. 3 ms after the HARQ-ACK, the SCell may be considered activated and a Temp RS may be sent.

In some cases, the MAC CE may indicate (e.g., via a bit field/codepoint) at least one trigger state, from a per-carrier aperiodic state list for the SCell carrier. The UE may then monitor for the Temp RS on the SCell based on an RS configuration associated with the at least one trigger state indicated in the MAC CE In this manner, a bit field/codepoint in the MAC CE may indicate one of a plurality of RRC-signaled per-carrier RS configurations. The UE may then monitor for the Temp RS on the SCell based on the indicated RS configuration.

As illustrated in the example timeline 600B of FIG. 6B, according to another option, a MAC CE carried in a PDSCH 612 may trigger SCell activation, while a downlink control information (DCI) 514 may trigger the Temp RS 604. In this case, the DCI may indicate (e.g., via a bit field/codepoint) at least one trigger state, from the per-carrier aperiodic state list for the SCell carrier. The UE may then monitor for the Temp RS on the SCell based on an RS configuration associated with the at least one trigger state indicated in the DCI.

Figure 7:
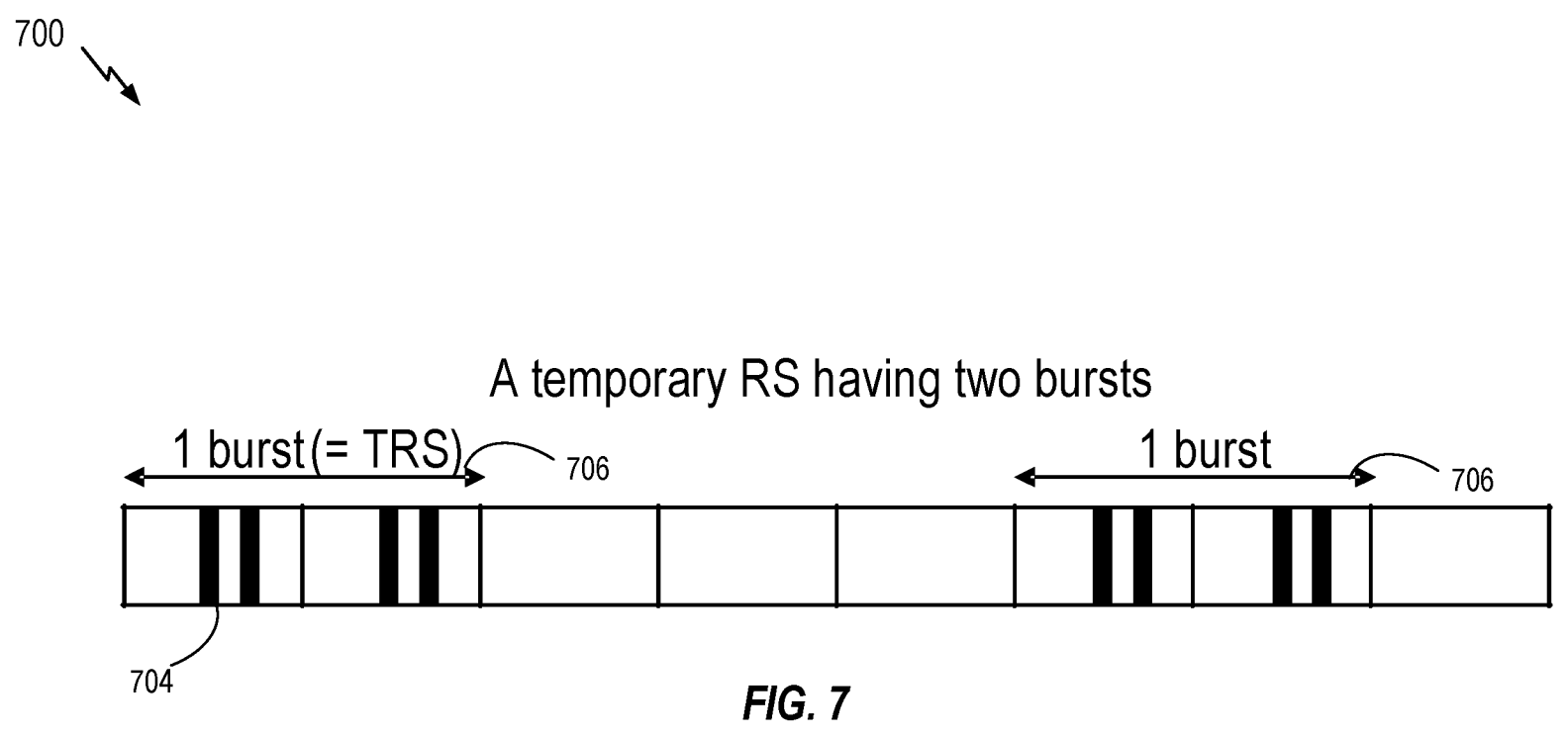

The RS configuration associated with a codepoint (e.g., a Temp RS trigger state) indicated in the MAC CE or DCI may configure Temp RSs of various forms. For example, FIG. 7 illustrates an example timeline 700 where a Temp RS has two bursts 706 of aperiodic tracking reference signals (A-TRS) 704. In the illustrated example, each burst spans two slots and four CSI-RS resources).

Such flexibility in defining a Temp RS may help cover multiple SCell activation scenarios. For example, in a first scenario, the SCell to be activated may be known and may belong to FR1. If the SCell measurement cycle is equal to or smaller than 2400 ms, one burst (e.g., a burst spanning 2 slots with four CSI-RS resources) may be used for time and frequency tracking. If the SCell measurement cycle is larger than 2400 ms, one burst (2-slot with four CSI-RS resources) may be used for automatic gain control (AGC). A separate burst (2-slot with four CSI-RS resources) may be used for time and frequency tracking, in addition to the burst used for AGC. The minimum gap, between both the RS symbols used for AGC and the RS symbols used for time and frequency acquisition, is 2 slots for 15 kHz and 30 kHz, and 3 slots for 60 kHz.

In a second scenario, the SCell may be unknown and belongs to FR1. When the SCell is contiguous to an active serving cell in the same band (e.g., Intra-band continuous CA), one burst (2-slot with four CSI-RS resources) may be used for AGC when the power difference in the serving cell and the to be activated SCell is smaller than or equal to 6 dB. Another burst (2-slot with four CSI-RS resources) may be used for time-frequency tracking.

In a third scenario, the SCell may belongs to FR2. If there is at least one active serving cell on that FR2 band and temporary RS for the target SCell is provided, one burst (2-slot with four CSI-RS resources) may be used for time-frequency tracking. If there is no active serving cell on that FR2 band, and the SCell to be activated is known to UE, one burst (2-slot with four CSI-RS resources) is necessary for time-frequency tracking. If the SCell being activated is unknown and there is no active serving cell on that FR2 band, temporary RS may not be used for AGC and there may be various considerations for how to use temporary RS for time/frequency tracking.

FIG. 8 is a call flow diagram 800 that illustrates SCell activation and Temp RS indication via a MAC CE (e.g., in line with the example shown in FIG. 6A). In some aspects, the network entity depicted in FIG. 8 and/or FIG. 9 may be an example of the network entity 102 depicted and described with respect to FIGS. 1 and 3 or a disaggregated network entity depicted and described with respect to FIG. 2. Similarly, the UE depicted in FIG. 8 and/or FIG. 9 may be an example of UE 104 depicted and described with respect to FIGS. 1 and 3.

As noted above, the UE may be configured with a plurality of RRC-signaled per-carrier RS configurations.

For example, as illustrated, at 806, the UE may receive radio resource control (RRC) signaling configuring the UE for channel state information (CSI) reporting with per-carrier aperiodic trigger state lists for one or more types of reference signals (RS). At 808, the network entity activates the SCell and triggers a temporary RS via a MAC CE. As noted above, a bit field/codepoint in the MAC CE may indicate one of a plurality of RRC-signaled per-carrier RS configurations. For example, as illustrated in FIG. 8, the MAC CE may indicate (via a bit field/codepoint) a trigger state associated with at least one RS per-carrier configuration.

As illustrated, at 810, the UE may then monitor for the Temp RS on the secondary cell based at least in part on at least one RS configuration associated with the at least one trigger state indicated in the MAC CE (at 808). The Temp RS may allow the UE to begin communicating in the SCell sooner than conventional SSB based SCell activation scenarios. For example, based on the Temp RS measurements, the UE may generate and send a CSI report, for example, before SBBs become available.

FIG. 9 is a call flow diagram 900 that illustrates SCell activation via a MAC CE and Temp RS indication via a DCI (e.g., in line with the example shown in FIG. 6B).

As illustrated, at 906, the UE may receive RRC signaling configuring the UE for CSI reporting with per-carrier aperiodic trigger state lists for one or more types of reference signals (RS). As illustrated, after RRC configuration, at 908, the network entity activates the SCell via a MAC CE and triggers the temporary RS via a DCI, at 910. As illustrated, at 912, the UE may then monitor for the temporary RS on the secondary cell based at least in part on at least one RS configuration indicated in the DCI (at 910).

Figure 10:
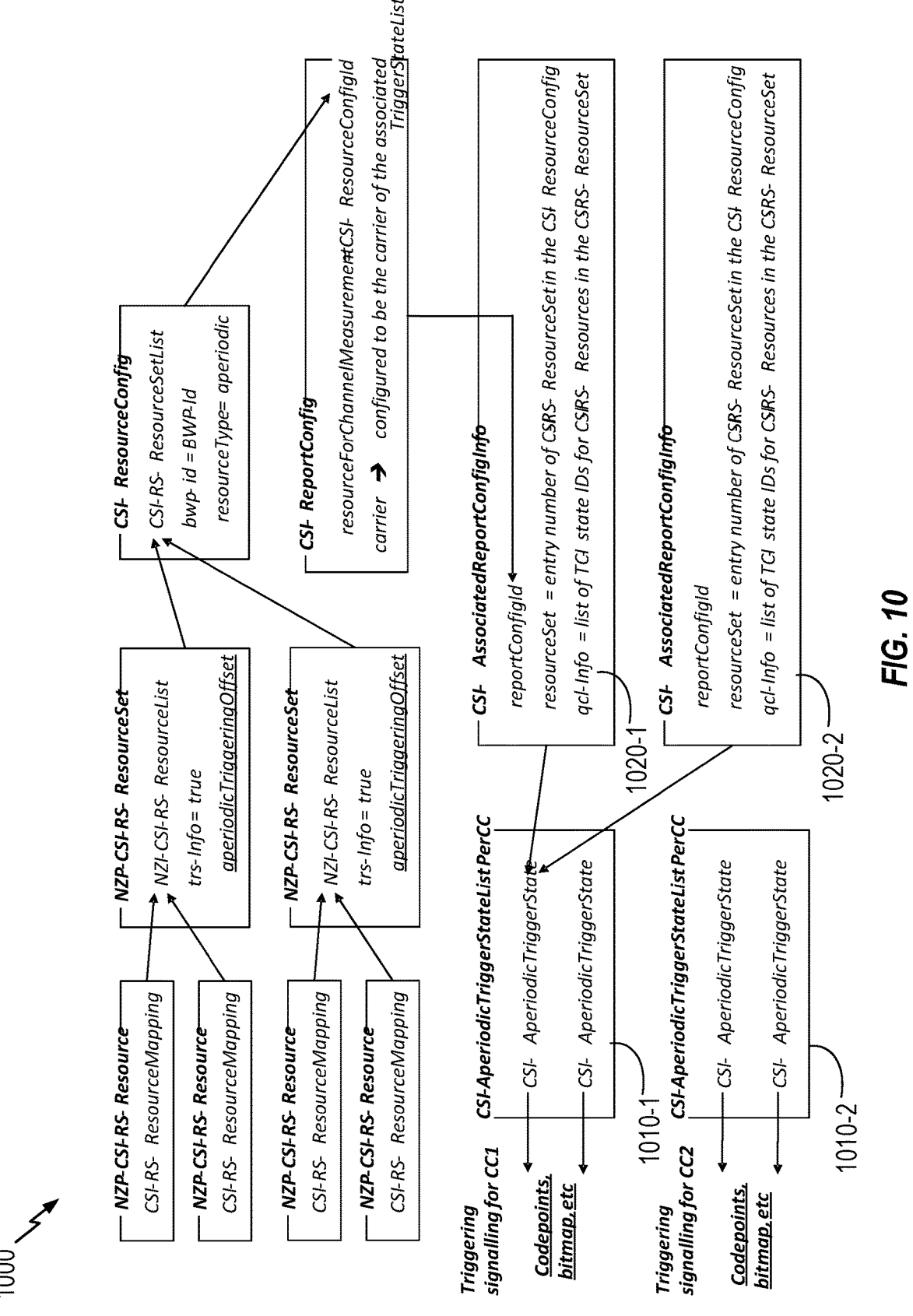
FIG. 10 is a diagram depicts an example CSI resource configuration, in accordance with some aspects of the present disclosure.

FIG. 10 illustrates an example of per-carrier aperiodic trigger state lists 1010 for Temp RS as proposed herein. The illustrated example shows RRC signaling that includes a first CSI-Aperiodic trigger state list 1010-1 for a first CC (CC1) and a second CSI-Aperiodic trigger state list 1010-2 for a second CC (CC2). Each CSI-Aperiodic trigger state list may be an RRC information element that indicates multiple trigger states (e.g., CSI-Aperiodic trigger states) for a respective carrier. The RRC signaling may include multiple CSI-Aperiodic trigger state lists that each correspond to a different carrier. As used herein, the term "CSI-Aperiodic trigger state list" means an indication of multiple CSI-Aperiodic trigger states.

As described above, trigger signaling (e.g., a MAC-CE, DCI, or other control information) may trigger a trigger state from a CSI-Aperiodic trigger state list. For example, the trigger signaling may include a trigger state indication field that includes a codepoint(s) or a bitmap to indicate a trigger state in the CSI-Aperiodic trigger state list. The trigger signaling may indicate a trigger state for each carrier. For example, as illustrated in FIG. 10, the trigger signaling may include a trigger state indication field for each carrier that is associated with a corresponding CSI-Aperiodic trigger state list for the carrier. In this way, the trigger signaling may indicate a trigger state (e.g., a CSI-Aperiodic trigger state from a CSI-Aperiodic trigger state list) on a per carrier basis. Accordingly, a CSI reporting configuration (e.g., as indicated by CSI-ReportConfig), which is associated with each respective trigger state, may be configured and triggered per carrier based on a CSI-Aperiodic trigger state list being provided on a per carrier basis.

As illustrated, each trigger state may be associated with one or more CSI-RS configurations (CSI-AssociatedReportConfigInfo). In the illustrated example, the first trigger state in the list for CC1 is associated with two CSI-RS configurations (1020-1 and 1020-2). By associating multiple RS configurations to a single trigger state, multiple aperiodic RS may be triggered (and used as Temp-RS) at the same time.

The carrier on which Temp-RS is triggered by a given trigger state may be the carrier associated with the associated trigger state list. For example, if a trigger state from the list 1010-1 for CC1 is triggered, the CSI-ResourceConfigID-carrier may be assumed to be CC1.

As noted above, a MAC-CE may activate an SCell and indicate an RS configuration to monitor in the SCell. There are various approaches to design such a MAC-CE suitable for indicating an RS configuration in the manners proposed herein, for example, by indicating a trigger state for triggering a Temp RS.

According to one option, a MAC-CE may have multiple blocks of bits (which may be referred to as Z-bit blocks), where each SCell has a Z-bit block defined, where the value of Z is greater than or equal to zero. A Z-bit block, for a given SCell, may indicate the temporary RS, for example, using a configuration index for the SCell. In some cases, an n-th codepoint of the Z-bit block may indicate an n-th trigger state of the list of trigger states for the SCell. A value of zero for a Z-bit block may indicate that there is no Temp RS resource transmitted for a corresponding SCell.

In some cases, the to-be-activated SCell may be indicated via certain values (C values) in a MAC CE that also triggers Temp RS. In cases where Temp RS is triggered with a separate DCI, C values of an existing SCell activation/de-activation MAC CE (e.g., of a legacy MAC CE format) may be used to indicate the to-be-activated SCell.

Example Methods

FIG. 11 illustrates example operations 1100 for wireless communication by a UE. The operations 1100 may be performed, for example, by a UE (e.g., such as a UE 104 of FIG. 1) to monitor for a temporary reference signal (RS) on a secondary cell (SCell) based on a RS configuration associated with a trigger state.

At 1110, the UE receives radio resource control (RRC) signaling configuring the UE for channel state information (CSI) reporting with per-carrier aperiodic trigger state lists for one or more types of reference signals (RS).

At 1120, the UE receives dynamic signaling that activates a secondary cell and indicates at least one trigger state from a per-carrier aperiodic trigger state list of the per-carrier aperiodic trigger state lists associated with the secondary cell.

At 1130, the UE monitors for a temporary RS on the secondary cell based at least in part on at least one RS configuration associated with the at least one trigger state.

FIG. 12 illustrates example operations 1200 for wireless communication by a network entity. The operations 1200 may be performed, for example, by a network entity (e.g., network entity 102 of FIG. 1) to transmit dynamic signaling that indicates at least one trigger state from one of the per-carrier aperiodic trigger state lists.

At 1210, the network entity transmits, to a UE, RRC signaling configuring the UE for CSI reporting with per-carrier aperiodic trigger state lists for one or more types of RS.

At 1220, the network entity transmits dynamic signaling that activates a secondary cell and indicates at least one trigger state from one of the per-carrier aperiodic trigger state lists associated with the secondary cell to trigger the UE to monitor for a temporary RS transmitted on the secondary cell based at least in part on at least one RS configuration associated with the at least one trigger state.

FIG. 13 illustrates example operations 1300 for wireless communication by a UE. The operations 1300 may be performed, for example, by a UE (e.g., such as a UE 104 of FIG. 1) to monitor for a temporary reference signal (RS) on a secondary cell (SCell) based on a RS configuration associated with a trigger state.

At 1310, the UE receives radio resource control (RRC) signaling configuring the UE with one or more per-carrier reference signal (RS) configurations.

At 1320, the UE receives dynamic signaling that activates a secondary cell and indicates at least one of the one or more per-carrier RS configurations.

At 1330, the UE monitors for a temporary RS on the secondary cell based at least in part on the at least one of the one or more RS configurations indicated by the dynamic signaling.

FIG. 14 illustrates example operations 1400 for wireless communication by a network entity. The operations 1400 may be performed, for example, by a network entity (e.g., network entity 102 of FIG. 1) to transmit dynamic signaling that indicates at least one trigger state from one of the per-carrier aperiodic trigger state lists.

At 1410, the network entity transmits, to a UE, radio resource control (RRC) signaling configuring a user equipment (UE) with one or more per-carrier reference signal (RS) configurations.

At 1420, the network entity transmits transmitting dynamic signaling that activates a secondary cell and indicates at least one of the one or more per-carrier RS configurations for temporary RS transmissions on the secondary cell.

Example Wireless Communication Devices

FIG. 15 depicts an example communications device 1500 that includes various components operable, configured, or adapted to perform operations for the techniques disclosed herein, such as the operations depicted and described with respect to FIG. 11 and FIG. 13 In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 11 and FIG. 13, or other operations for performing the various techniques discussed herein for receiving channel state information (CSI) report configurations with per-carrier trigger state lists.

In the depicted example, computer-readable medium/memory 1530 stores code 1531 for receiving RRC signaling configuring the UE for CSI reporting with per-carrier aperiodic trigger state lists for one or more types of RS, code 1532 for receiving dynamic signaling that activates a secondary cell and indicates at least one trigger state from one of the per-carrier aperiodic trigger state lists associated with the secondary cell, and code 1533 for monitoring for a temporary RS on the secondary cell based on at least one RS configuration associated with the at least one trigger state. Moreover, computer-readable medium/memory 1530 stores code for receiving radio resource control (RRC) signaling configuring the UE with one or more per-carrier reference signal (RS) configurations, code for receiving dynamic signaling that activates a secondary cell and indicates at least one of the one or more per-carrier RS configurations, and code for monitoring for a temporary RS on the secondary cell based at least in part on the at least one of the one or more RS configurations indicated by the dynamic signaling.

In the depicted example, the one or more processors 1520 include circuitry configured to implement the code stored in the computer-readable medium/memory 1530, including circuitry 1521 for receiving RRC signaling configuring the UE for CSI reporting with per-carrier aperiodic trigger state lists for one or more types of RS, circuitry 1522 for receiving dynamic signaling that activates a secondary cell and indicates at least one trigger state from one of the per-carrier aperiodic trigger state lists associated with the secondary cell, and circuitry 1523 for monitoring for a temporary RS on the secondary cell based on at least one RS configuration associated with the at least one trigger state. Moreover, the one or more processors 1520 include circuitry configured to implement the code stored in the computer-readable medium/memory 1530, including circuitry for RRC signaling configuring the UE with one or more per-carrier RS configurations, circuitry for dynamic signaling that activates a secondary cell and indicates at least one of the one or more per-carrier RS configurations, and circuitry for monitoring for a temporary RS on the secondary cell based at least in part on the at least one of the one or more RS configurations indicated by the dynamic signaling.

Various components of communications device 1500 may provide means for performing the methods described herein, including with respect to FIG. 11 and FIG. 13.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving and/or monitoring may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including receiving CSI report configurations 281 with per-carrier trigger state lists).

Notably, FIG. 15 is an example, and many other examples and configurations of communication device 1500 are possible.

FIG. 16 depicts an example communications device 1600 that includes various components operable, configured, or adapted to perform operations for the techniques disclosed herein, such as the operations depicted and described with respect to FIG. 12 and FIG. 14. In some examples, communication device 1600 may be a network entity 102 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIG. 12 and FIG. 14, or other operations for performing the various techniques discussed herein for transmitting CSI report configurations with per-carrier trigger state lists.

In the depicted example, computer-readable medium/memory 1630 stores code 1631 for transmitting, to a UE, RRC signaling configuring the UE for CSI reporting with per-carrier aperiodic trigger state lists for one or more types of RS, and code 1632 for transmitting dynamic signaling that activates a secondary cell and indicates at least one trigger state from one of the per-carrier aperiodic trigger state lists associated with the secondary cell to trigger the UE to monitor for a temporary RS transmitted on the secondary cell based on at least one RS configuration associated with the at least one trigger state. Moreover, computer-readable medium/memory 1630 stores code for transmitting, to a UE, RRC signaling configuring a UE with one or more per-carrier RS configurations, and code for transmitting dynamic signaling that activates a secondary cell and indicates at least one of the one or more per-carrier RS configurations for temporary RS transmissions on the secondary cell.

In the depicted example, the one or more processors 1620 include circuitry configured to implement the code stored in the computer-readable medium/memory 1630, including circuitry 1621 for transmitting, to a UE, RRC signaling configuring the UE for CSI reporting with per-carrier aperiodic trigger state lists or one or more types of RS, and circuitry 1622 for transmitting dynamic signaling that activates a secondary cell and indicates at least one trigger state from one of the per-carrier aperiodic trigger state lists associated with the secondary cell to trigger the UE to monitor for a temporary RS transmitted on the secondary cell based on at least one RS configuration associated with the at least one trigger state. Moreover, the one or more processors 1620 include circuitry configured to implement the code stored in the computer-readable medium/memory 1630, including circuitry for transmitting, to a UE, RRC signaling configuring a UE with one or more per-carrier RS configurations, and circuitry for transmitting dynamic signaling that activates a secondary cell and indicates at least one of the one or more per-carrier RS configurations for temporary RS transmissions on the secondary cell.

Various components of communications device 1600 may provide means for performing the methods described herein, including with respect to FIG. 12 and FIG. 14.

In some examples, means for transmitting or sending (or means for outputting for transmission) may include the transceivers 232 and/or antenna(s) 234 of the network entity 102 illustrated in FIG. 2 and/or transceiver 1608 and antenna 1610 of the communication device 1600 in FIG. 16.

In some examples, means for receiving (or means for obtaining) may include the transceivers 232 and/or antenna(s) 234 of the network entity illustrated in FIG. 2 and/or transceiver 1608 and antenna 1610 of the communication device 1600 in FIG. 16.

In some examples, means for transmitting may include various processing system components, such as: the one or more processors 1620 in FIG. 16, or aspects of the network entity 102 depicted in FIG. 2, including receive processor 238, transmit processor 220, TX MIMO processor 230, and/or controller/processor 240 (including CSI report component 241).

Notably, FIG. 16 is an example, and many other examples and configurations of communication device 1600 are possible.

Example Clauses

Implementation examples are described in the following numbered clauses:

Clause 1: A method for wireless communications by a user equipment (UE), comprising: receiving radio resource control (RRC) signaling configuring the UE with one or more per-carrier reference signal (RS) configurations, receiving dynamic signaling that activates a secondary cell and indicates at least one of the one or more per-carrier RS configurations, and monitoring for a temporary RS on the secondary cell based at least in part on the at least one of the one or more RS configurations indicated by the dynamic signaling.

Clause 2: The method of clause 1, wherein the temporary RS comprises at least one of a CSI-RS or a tracking RS (TRS).

Clause 3: The method of any one of clauses 1-2, wherein the at least one of the one or more RS configurations associated with at least one trigger state comprises an RS configuration associated with a CSI report configuration for a carrier of per-carrier aperiodic trigger state lists associated with the secondary cell.

Clause 4: The method of any one of clauses 1-3, wherein the dynamic signaling comprises a medium access control (MAC) control element (CE) that activates the secondary cell.

Clause 5: The method of clause 4, wherein the dynamic signaling further comprises a downlink control information (DCI) that indicates at least one trigger state.

Clause 6: The method of any one of clauses 4-5, wherein the MAC CE indicates the at least one trigger state.

Clause 7: The method of any one of clauses 4-6, wherein the MAC CE comprises a block of bits associated with the secondary cell.

Clause 8: The method of clause 7, wherein the block of bits identifies the at least one of the one or more RS configurations indicating the temporary RS.

Clause 9: The method of any one of clauses 7-8, wherein a value of zero for the block of bits indicates that no temporary RS is used for the secondary cell.

Clause 10: The method of any one of clauses 4-9, wherein: the MAC CE activates multiple secondary cells; and the MAC CE comprises multiple blocks of bits, wherein each of the blocks of bits is associated with a different secondary cell of the multiple secondary cells activated by the MAC CE.

Clause 11: A method for wireless communications by a network entity, comprising: transmitting radio resource control (RRC) signaling configuring a user equipment (UE) with one or more per-carrier reference signal (RS) configurations; and transmitting dynamic signaling that activates a secondary cell and indicates at least one of the one or more per-carrier RS configurations for temporary RS transmissions on the secondary cell.

Clause 12: The method of clause 11, wherein the temporary RS comprises at least one of a CSI-RS or a tracking RS (TRS).

Clause 13: The method of any one of clauses 11-12, wherein the at least one of the one or more RS configurations associated with at least one trigger state comprises an RS configuration associated with a CSI report configuration for a carrier of per-carrier aperiodic trigger state lists associated with the secondary cell.

Clause 14: The method of any one of clauses 11-13, wherein the dynamic signaling comprises a medium access control (MAC) control element (CE) that activates the secondary cell.

Clause 15: The method of clause 14, wherein the dynamic signaling further comprises a downlink control information (DCI) that indicates at least one trigger state.

Clause 16: The method of any one of clauses 14-15, wherein the MAC CE indicates at least one trigger state.

Clause 17: The method of clause 16, wherein the MAC CE comprises multiple blocks of bits, each block of bits associated with a different secondary cell.

Clause 18: The method of clause 17, wherein the block of bits identifies the at least one of the one or more RS configurations indicating the temporary RS.

Clause 19: The method of any one of clauses 16-18, wherein the network entity is configured to set a block of bits to a value of zero to indicate that no temporary RS is used for the secondary cell.

Clause 20: The method of any one of clauses 14-19, wherein: the MAC CE activates multiple secondary cells; and the MAC CE comprises multiple blocks of bits, wherein each of the blocks of bits is associated with a different secondary cell of the multiple secondary cells activated by the MAC CE.

Clause 21: A method for wireless communications by a user equipment (UE), comprising receiving radio resource control (RRC) signaling configuring the UE for channel state information (CSI) reporting with per-carrier aperiodic trigger state lists for one or more types of reference signals (RS), receiving dynamic signaling that activates a secondary cell and indicates at least one trigger state from a per-carrier aperiodic trigger state list of the per-carrier aperiodic trigger state lists associated with the secondary cell, and monitoring for a temporary RS on the secondary cell based at least in part on at least one of the one or more RS configurations associated with the at least one trigger state.

Clause 22: The method of clause 21, wherein the temporary RS comprises at least one of a CSI-RS or a tracking RS (TRS).

Clause 23: The method of any one of clauses 21 through 22, wherein the at least one of the one or more RS configurations associated with the at least one trigger state comprises an RS configuration associated with a CSI report configuration for a carrier of the per-carrier aperiodic trigger state lists associated with the secondary cell.

Clause 24: The method of any one of clauses 21 through 23, wherein the dynamic signaling comprises a medium access control (MAC) control element (CE) that activates the secondary cell.

Clause 25: The method of clause 24, wherein the dynamic signaling further comprises a downlink control information (DCI) that indicates the at least one trigger state.

Clause 26: The method of any one of clauses 24 through 25, wherein the MAC CE indicates the at least one trigger state.

Clause 27: The method of clause 26, wherein the MAC CE comprises multiple blocks of bits, each block of bits associated with a different secondary cell.

Clause 28: The method of clause 27, wherein the block of bits associated with the secondary cell activated by the MAC CE indicates the temporary RS by indicating the at least one trigger state from the per-carrier aperiodic trigger state lists associated with that secondary cell.

Clause 29: The method of clause 28, wherein the UE is configured to interpret a value of zero for a block of bits as an indication no temporary RS is triggered for a secondary cell associated with that block of bits.

Clause 30: The method of any one of clauses 26 through 29, wherein a separate set of bits in the MAC CE indicates the activated secondary cell.

Clause 31: A method for wireless communications by a network entity, comprising transmitting, to a user equipment (UE), radio resource control (RRC) signaling configuring the UE for channel state information (CSI) reporting with per-carrier aperiodic trigger state lists for one or more types of reference signals (RS), and transmitting dynamic signaling that activates a secondary cell and indicates at least one trigger state from one of the per-carrier aperiodic trigger state lists associated with the secondary cell to trigger the UE to monitor for a temporary RS transmitted on the secondary cell based at least in part on at least one of the one or more RS configurations associated with the at least one trigger state.

Clause 32: The method of clause 31, wherein the temporary RS comprises at least one of a CSI-RS or a tracking RS (TRS).

Clause 33: The method of any one of clauses 31 through 32, wherein the at least one of the one or more RS configurations associated with the at least one trigger state comprises an RS configuration associated with a CSI report configuration for a carrier of the per-carrier aperiodic trigger state lists associated with the secondary cell.

Clause 34: The method of any one of clauses 31 through 33, wherein the dynamic signaling comprises a medium access control (MAC) control element (CE) that activates the secondary cell.

Clause 35: The method of clause 34, wherein the dynamic signaling further comprises a downlink control information (DCI) that indicates the at least one trigger state.

Clause 36: The method of any one of clauses 34 through 35, wherein the MAC CE also indicates the at least one trigger state.

Clause 37: The method of clause 36, wherein the MAC CE comprises multiple blocks of bits, each block of bits associated with a different secondary cell.

Clause 38: The method of clause 37, wherein the block of bits associated with the secondary cell activated by the MAC CE indicates the temporary RS by indicating the at least one trigger state from the per-carrier aperiodic trigger state lists associated with that secondary cell.

Clause 39: The method of any one of clauses 36 through 38, wherein a separate set of bits in the MAC CE indicates the activated secondary cell.

Clause 40: An apparatus, comprising: a memory comprising executable instructions; one or more processors configured to execute the executable instructions and cause the apparatus to perform a method in accordance with any one of Clauses 1-39.

Clause 41: An apparatus, comprising means for performing a method in accordance with any one of Clauses 1-39.

Clause 42: A non-transitory computer-readable medium comprising executable instructions that, when executed by one or more processors of an apparatus, cause the apparatus to perform a method in accordance with any one of Clauses 1-39.

Clause 43: A computer program product embodied on a computer-readable storage medium comprising code for performing a method in accordance with any one of Clauses 1-39.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and network entity, next generation NodeB (gNB or gNodeB), access point (AP), distributed unit (DU), carrier, or transmission reception point may be used interchangeably. A network entity may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A network entity for a macro cell may be referred to as a macro base station (BS). A network entity for a pico cell may be referred to as a pico BS. A network entity for a femto cell may be referred to as a femto BS, home BS, or a home NodeB.

Network entities 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Network entities 102 configured for 5G (e.g., 5G NR or Next Generation RAN (NG-RAN)) may interface with 5GC 190 through second backhaul links 184. Network entities 102 may communicate directly or indirectly (e.g., through the EPC 160 or 5GC 190) with each other over third backhaul links 134 (e.g., X2 interface). Third backhaul links 134 may generally be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600

MHz, which is sometimes referred to (interchangeably) as a "millimeter wave" ("mmW" or "mmWave"). A network entity configured to communicate using mmWave/near mmWave radio frequency bands (e.g., a mmWave network entity such as network entity 180) may utilize beamforming (e.g., 182) with a UE (e.g., 104) to improve path loss and range.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some network entities, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave network entity.

The communication links 120 between network entities 102 and, for example, UEs 104, may be through one or more carriers. For example, network entities 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management. Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the network entities 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of network entity 102 and UE 104 (e.g., the wireless communication network 100 of FIG. 1) are depicted, which may be used to implement aspects of the present disclosure.

At network entity 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the network entity 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to network entity 102.

At network entity 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for network entity 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/ duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the network entity. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a network entity for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of monitoring for a temporary reference signal (RS) on a secondary cell (SCell) based on a RS configuration associated with a trigger state in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    receiving radio resource control (RRC) signaling configuring the UE with one or more per-carrier reference signal (RS) configurations;
    receiving dynamic signaling that activates a secondary cell and indicates at least one per-carrier RS configuration of the one or more per-carrier RS configurations, wherein:
        the at least one per-carrier RS configuration is associated with at least one trigger state of a per-carrier aperiodic trigger state list associated with the secondary cell; and
        the at least one per-carrier RS configuration comprises an RS configuration that is associated with a CSI report configuration for a carrier of the per-carrier aperiodic trigger state list associated with the secondary cell; and
    monitoring for a temporary RS on the secondary cell based at least in part on the at least one per-carrier RS configuration indicated by the dynamic signaling.

2. The method of claim 1, wherein the temporary RS comprises at least one of a CSI-RS or a tracking RS (TRS).

3. The method of claim 1, wherein the dynamic signaling comprises a medium access control (MAC) control element (CE) that activates the secondary cell.

4. The method of claim 3, wherein the dynamic signaling further comprises a downlink control information (DCI) that indicates at least one trigger state.

5. The method of claim 3, wherein the MAC CE indicates at least one trigger state.

6. The method of claim 3, wherein the MAC CE comprises a first block of bits associated with the secondary cell.

7. The method of claim 6, wherein the first block of bits identifies the at least one per-carrier RS configuration indicating the temporary RS.

8. The method of claim 6, wherein:
    the MAC CE comprises a second block of bits associated with another secondary cell; and
    a value of zero for the second block of bits indicates that no temporary RS is used for the other secondary cell.

9. The method of claim 3, wherein:
    the MAC CE activates multiple secondary cells; and
    the MAC CE comprises multiple blocks of bits, wherein each of the blocks of bits is associated with a different secondary cell of the multiple secondary cells activated by the MAC CE.

10. A method for wireless communications by a network entity, comprising:
    transmitting radio resource control (RRC) signaling configuring a user equipment (UE) with one or more per-carrier reference signal (RS) configurations; and
    transmitting dynamic signaling that activates a secondary cell and indicates at least one per-carrier RS configuration of the one or more per-carrier RS configurations for transmission of a temporary RS on the secondary cell, wherein:
        the at least one per-carrier RS configuration is associated with at least one trigger state of a per-carrier aperiodic trigger state list associated with the secondary cell; and the at least one per-carrier RS configuration comprises an RS configuration that is associated with a CSI report configuration for a carrier of the per-carrier aperiodic trigger state list associated with the secondary cell.

11. The method of claim 10, wherein the temporary RS comprises at least one of a CSI-RS or a tracking RS (TRS).

12. The method of claim 10, wherein the dynamic signaling comprises a medium access control (MAC) control element (CE) that activates the secondary cell.

13. The method of claim 12, wherein the dynamic signaling further comprises a downlink control information (DCI) that indicates at least one trigger state.

14. The method of claim 12, wherein the MAC CE indicates at least one trigger state.

15. The method of claim 14, wherein:
    the MAC CE comprises multiple blocks of bits, including a first block of bits associated with the secondary cell, and
    each different block of bits of the multiple block of bits is associated with a different secondary cell.

16. The method of claim 15, wherein the first block of bits identifies the at least one per-carrier RS configuration indicating the temporary RS.

17. The method of claim 14, wherein:
    the MAC CE comprises a second block of bits associated with another secondary cell; and
    a value of zero for the second block of bits indicates that no temporary RS is used for the other secondary cell.

18. The method of claim 12, wherein:
    the MAC CE activates multiple secondary cells; and
    the MAC CE comprises multiple blocks of bits, wherein each of the blocks of bits is associated with a different secondary cell of the multiple secondary cells activated by the MAC CE.

19. An apparatus for wireless communications, comprising:
    at least one processor; and
    a memory coupled to the at least one processor, the memory comprising code executable by the at least one processor to cause the apparatus to:
        receive radio resource control (RRC) signaling configuring a user equipment (UE) with one or more per-carrier reference signal (RS) configurations;
        receive dynamic signaling that activates a secondary cell and indicates at least one per-carrier RS configuration of the one or more per-carrier RS configurations, wherein:
            the at least one per-carrier RS configuration is associated with at least one trigger state of a per-carrier aperiodic trigger state list associated with the secondary cell; and
            the at least one per-carrier RS configuration comprises an RS configuration that is associated with a CSI report configuration for a carrier of the per-carrier aperiodic trigger state list associated with the secondary cell; and
        monitor for a temporary RS on the secondary cell based at least in part on the at least one per-carrier RS configuration indicated by the dynamic signaling.

20. The apparatus of claim 19, wherein the dynamic signaling comprises a medium access control (MAC) control element (CE) that activates the secondary cell.

21. The apparatus of claim 20, wherein the MAC CE comprises a first block of bits associated with the secondary cell.

22. The apparatus of claim 21, wherein the first block of bits identifies the at least one per-carrier RS configuration indicating the temporary RS.

23. The apparatus of claim 21, wherein:

the MAC CE comprises a second block of bits associated with another secondary cell; and a value of zero for the second block of bits indicates that no temporary RS is used for the other secondary cell.

24. An apparatus for wireless communications, comprising:

at least one processor; and a memory coupled to the at least one processor, the memory comprising code executable by the at least one processor to cause the apparatus to:

transmit radio resource control (RRC) signaling configuring a user equipment (UE) with one or more per-carrier reference signal (RS) configurations; and transmit dynamic signaling that activates a secondary cell and indicates at least one per-carrier RS configuration of the one or more per-carrier RS configurations for transmission of a temporary RS on the secondary cell, wherein:

the at least one per-carrier RS configuration is associated with at least one trigger state of a per-carrier aperiodic trigger state list associated with the secondary cell; and the at least one per-carrier RS configuration comprises an RS configuration that is associated with a CSI report configuration for a carrier of the per-carrier aperiodic trigger state list associated with the secondary cell.

25. The apparatus of claim 24, wherein the dynamic signaling comprises a medium access control (MAC) control element (CE) that activates the secondary cell.

26. The apparatus of claim 25, wherein:

the MAC CE comprises multiple blocks of bits, including a first block of bits associated with the secondary cell, and each different block of bits of the multiple block of bits is associated with a different secondary cell.

27. The apparatus of claim 26, wherein the first block of bits identifies the at least one per-carrier RS configuration indicating the temporary RS.

28. The apparatus of claim 26, wherein:

the MAC CE comprises a second block of bits associated with another secondary cell; and a value of zero for the second block of bits indicates that no temporary RS is used for the other secondary cell.

\* \* \* \* \*